United States Patent [19]

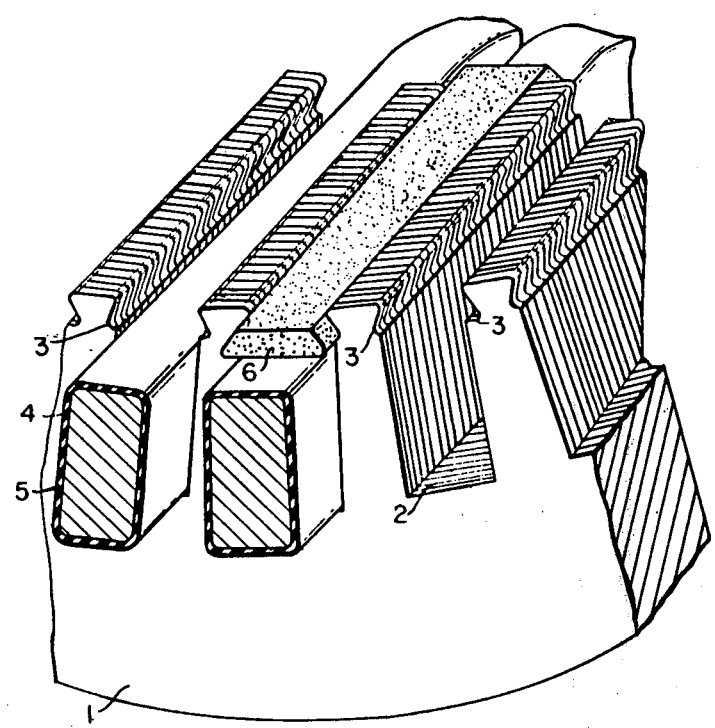

Simmonds

[11] 4,040,971
[45] Aug. 9, 1977

[54] MAGNETIC WEDGE

[75] Inventor: Leonard B. Simmonds, Monroeville, Pa.

[73] Assignee: Westinghouse Electric Corporation, Pittsburgh, Pa.

[21] Appl. No.: 646,793

[22] Filed: Jan. 6, 1976

Related U.S. Application Data

[62] Division of Ser. No. 219,663, Jan. 21, 1972, Pat. No. 3,976,902.

[51] Int. Cl.² .............................................. H01F 1/00
[52] U.S. Cl. ................................................ 252/62.54
[58] Field of Search .................. 252/62.54; 252/62.53,

[56] References Cited

U.S. PATENT DOCUMENTS

| | | | |
|---|---|---|---|
| 2,526,174 | 10/1950 | Ukropina | 264/72 |
| 2,716,070 | 8/1955 | Seipt | 264/108 |
| 2,849,312 | 8/1958 | Peterman | 264/108 |
| 3,024,392 | 3/1962 | Baermann | 264/108 |
| 3,066,355 | 12/1962 | Sckloemann et al. | 264/24 |
| 3,470,021 | 9/1969 | Hendrix et al. | 252/62.54 X |
| 3,867,299 | 2/1975 | Rohatgi | 252/62.54 |

Primary Examiner—F.C. Edmundson
Attorney, Agent, or Firm—R. D. Fuerle

[57] ABSTRACT

A magnetic wedge is made by preparing a composition of a thermosetting resin system and magnetizable particles, placing the composition in a mold, vibrating the mold at least until air bubbles are no longer evolved from the composition, curing the composition, and fabricating the lower portion of the cured composition into the shape desired for the wedge. The vibration removes air and compacts the particles which results in a wedge having overall superior physical and magnetic properties.

9 Claims, 1 Drawing Figure

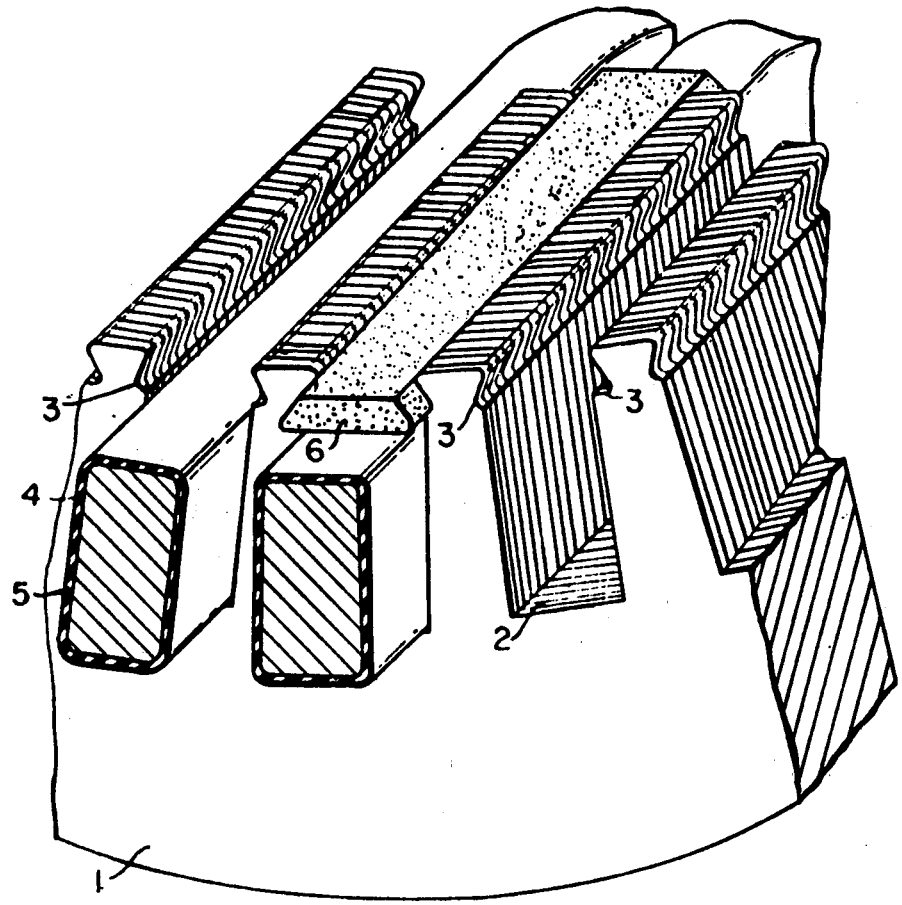

MAGNETIC WEDGE

This is a division of application Ser. No. 219,663, filed Jan. 21, 1972, now U.S. Pat. No. 3,976,902.

BACKGROUND OF THE INVENTION

In the manufacture of motors and generators, coils of wire are placed in slots in laminated iron cores. These coils are held in place by wedges which are inserted over the coils in the slots. Although nonmetallic fiber reinforced wedges have been used, magnetic wedges can increase the efficiency of the motor or generator by reducing core loss, temperature, frame size, and number of slots, and increasing the starting torque. (See U.S. Pat. Nos. 1,605,112 and 1,231,588). Magnetic wedges have been made from powdered iron and epoxy resins, (see U.S. Pat. No. 3,447,009) but until now it has been difficult to achieve both good physical properties and good magnetic properties in these wedges.

Good physical properties include high flexural strength since the wedge must withstand considerable stress when it is rammed into the slot and when the motor or generator is running. Also, the deflection temperature should be high since considerable heat is generated. Good magnetic properties include high permeability and low magnetic retention. The core loss, which results from eddy currents and other causes should also be low.

SUMMARY OF THE INVENTION

I have found that magnetic wedges having superior physical and magnetic properties can be prepared by vibrating a mold containing a composition of a thermosetting resin system and magnetizable particles. After air bubbles are no longer evolved the composition is cured and the lower portion is shaped into the wedge. The wedges of this invention have a higher flexural strength and a lower weight loss after 100 hours at 180° C than do prior art wedges. Also, they have higher magnetic permeabilities, low resistance, low magnetic retention, and result in low core loss.

THE DRAWING

The drawing is an isometric view of a section of a core of a motor or generator.

A laminated iron core 1 is provided with slots 2 which have grooves 3. Coils of wire 4 wrapped in insulation 5 are placed in slots 2 and held there by magnetic wedges 6 which are contoured to fit into grooves 3.

THE COMPOSITION

The wedges are made from a composition of a thermosetting resin system and a filler of magnetizable particles. If the proportion of the resin system is too high, a great deal of the cured resin will have to be machined away in order to make the wedge which is an expensive operation and wastes resin unnecessarily. Therefore, the composition is preferably at least about 75% filler (all percentages herein are by weight unless otherwise indicated) and less than about 25% resin system. On the other hand, if the proportion of filler is too high the composition will not flow and fill the mold, and the particles will not settle easily when the composition is vibrated. Therefore, the composition is preferably at at least about 15% resin system and less than about 85% filler.

The magnetizable partles are preferably iron as iron is inexpensive and has a low magnetic retention, although nickel, cobalt, and various magnetic alloys could also be used. The particles should not be too fine or they will not settle in a reasonable amount of time, and should therefore preferably be greater than about 0.001 mm. If the particles are too large the interstices become large and good compaction is impossible. Therefore, it is preferable that the particles be less than about 0.1 mm. Also, a mixture of sizes within the indicated range is preferred as greater compaction can be achieved with a distribution of particle size rather than with particles of all the same size.

Preferably the particles are elongated (e.g. very thin wires or whiskers) so that they can be aligned lengthwise with the length of the wedge for maximum mechanical strength. The elongated particles should have a length-to-diameter ratio of at least about 50 and preferably at least about 250 for the best flexural modulus. Typically, the elongated particles are about 0.0003 inches in diameter and about 0.075 inches long.

The thermosetting resin system comprises a thermosetting resin and such hardeners, accelerators, etc. as are necessary to cure the resin. The viscosity of the resin system should preferably be less than about 300 cps. measured at 25° C if no solvent is present. If a solvent is present the viscosity of the remaining components of the resin system may exceed 300 cps but the resin system (including the solvent) should still preferably have a viscosity less than about 300 cps. Solvents are preferably not used as they are difficult to remove during curing. The thermosetting resin when cured, should have a deflection temperature of at least 150° C to withstand the high temperatures encountered in motors and generators. (See ASTM D648). The cured resin should also have a flexural strength of at least 10,000 psi at 25° C so that the wedge can withstand the stresses of asembly and use.

Polyester resins and epoxy resins are among the suitable resins. Epoxy resins are preferred because they cure slowly enough to permit additional vibration after a partial cure and before the final cure.

The composition also preferably includes about 0.5 to about 1.5% of a flexibilizer if the resin is brittle as most epoxy resins are. A flexibilizer reduces the brittleness and becomes part of the cured resin. The preferred flexibilizer is polypropylene glycol as it works well and is non-toxic, but other flexibilizers, which do not appreciably lower the heat distortion temperature could also be used.

THE METHOD

The composition is prepared, preferably by mixing under a vacuum to exclude air, and is placed in a mold connected to a vibrator. The mold is in the approximate shape of one or more wedges and may be horizontal or vertical. Vertical molds offer the advantage that, after curing, it is easier to remove the resin at the top of the mold which does not contain much filler. However, air bubbles must travel farther through a vertical mold and the filler density may be greater at the bottom of the mold than at the top. For these reasons, a horizontal mold is preferred.

The mold is vibrated, preferably at a frequency of about 2 to about 60 cycles/sec and an amplitude of about 3 to about 6 mils, until air bubbles are no longer evolved, usually about 15 minutes. The vibration may be in any direction, including a circular vibration. If the particles are elongated the vibration is preferably done in a magnetic field, with the poles of the field at the ends of the mold. The magnetic field aligns the particles in the direction of the length of the wedge for maximum physical strength. A uniform field of at least about 10 gauss should be used and preferably of at least about 100 gauss for faster alignment of the particles.

The mold is then placed in an oven and cured at the curing temperature of the particular resin used. If an epoxy resin is used, it is preferably to heat composition at about 80° C to about 100° C for about 15 minutes in order to lower its viscosity, and then vibrate the mold an additional 5 minutes to remove any bubbles that may have been evolved during the initial heating period, before finishing the cure at about 100° C to about 120° C for about 45 minutes. Preferably, the composition is then cured at about 120° C to about 200° C for about 4 hours, and cooled slowly in an oven to prevent warping. Alternatively, the mold could be vibrated during the cure.

The resin on the upper portion, usually not greater than the upper two fifths, which contain little filler, is removed, for example by grinding. The piece is cut to the approximate size of a wedge and is machined to the exact size. Typical wedges are about 5 to 6 inches long, about ¾ to 1 inch wide, and about ⅛ to ¼ inch thick. About 10 to 14 wedges would typically be used to fill a slot and a motor or generator may have about 48 slots. The wedges contain about 65 to 70% by volume filler and if the filler is iron, they contain about 80 to 90% (by weight) iron, and preferably about 83 to 90% iron. The 100° C. The composition was vibrated an additional 5 minutes, and returned to the oven for 45 more minutes. The composition was cured at 150° C for 4 hours and slowly cooled. The top of the molded piece was ground off until the piece was 0.16 inches deep. The wedge was compared to two other commerical magnetic wedges of the same dimensions. The European wedge was an iron powder-resin material and the U.S. wedge was a randomly-dispersed glass-fiber reinforced materail with a metallic filler. The following table gives the results.

| Type of Wedge | Flexural Strength 25° C, ASTM$_{(psi)}$ | Weight Loss After 100 Hours (%) | Re-sistance ($\Omega$/cm) | Specific Gravity |
|---|---|---|---|---|
| This Example | 11,300 | 0.10 | 1305 | 3.9 |
| European | 6,350 | 0.14 | — | 4.0 |
| U.S. | 5,250 | 0.40 | 200 | 3.6 |

The above table shows that, compared to the other two commercial wedges, the wedges of this invention have a far greater flexural strength, and less weight loss after 100 hours at 180° C, which is severe test of durability. The higher resistance also indicates less losses from eddy currents.

The wedge of this example and three commercial wedges were tested on a 150 amp, 2080 volt, 1185 rpm, 600hp AC motor. The following table gives the results:

| Type of Wedge | No Load (KW) | Friction and Windage (KW) | No Load I²R | Core Loss (KW) | Magnetizing Amps | Reduction in Core Loss | Locked kva | Locked kw | Starting Torque | Reduction in Starting Torque |
|---|---|---|---|---|---|---|---|---|---|---|
| This Example | 13.0 | 6.0 | 0.5 | 6.5 | 40.2 | −46.5% | 66.0 | 628 | 70.0 | −5% |
| European | 12.4 | 6.15 | 0.48 | 5.77 | 41.0 | −48% | 65.7 | 657 | 69.5 | −6% |
| U.S. | 14.6 | 6.0 | 0.5 | 8.10 | 44.0 | −27% | 66.8 | 736 | 79.0 | +7% |
| Non-Magnetic | 16.64 | 4.9 | 0.64 | 11.1 | 47.2 | 0 | 67.4 | 757 | 75.7 | 0 |

The above table shows that the wedge of this example compared favorably with commercial wedges in magnetic and electrical properties.

wedges may be used in motors and generators, but offer the greatest advantages when used in A.C. motors.

EXAMPLE 1

The following composition was prepared, mixing under a vacuum.

| % by weight | |
|---|---|
| 8.9 | alicyclic diepoxy carboxylate, viscosity = 275 cps at 25° C, of the formula O—◯—CH$_2$—O—C(=O)—◯—O sold by Ciba — Geigy CO under the trademark "CY179" |
| 9.1 | Hexahydrophthalic anhydride |
| 0.9 | Polypropylene glycol (mole. wt. = 425) |
| 1.1 | Organometallic accelerator sold by Ciba — Geigy Co. under the trademark "C.Y.065" |
| 80.0 | Iron particles sold by Hoeganaes Corp. under the trademark "MH 300" Sieve analysis: 4% + 230, 10% − 230 to + 325, 86% − 325. |

About 10,242 gms of the composition was placed in a horizontal mold having dimensions 25 inches long, 25 inches wide, and 0.25 inches deep. The mold was placed on a jogger vibrator and vibrated at an amplitude of 5 mils and a frequency 60 cycles/sec for 15 minutes. It was then placed in an oven at 120° C for 15 minutes which gave the composition a temperature of about The wedge was placed in the center of an air core transformer and the resulting increase in flux linkages was measured. The test showed that at an applied force at 1000 ampere turns per inch about 26.25 kilolines of flux per square inch were generated. This figure was higher than that obtained for any other commercial magnetic wedge or for any other experimental wedge tested. It indicates very high permeability and efficiency.

EXAMPLE 2

Example 1 is repeated except that the iron particles are elongated and have a length to diameter ratio of not less than 50. The results are similar except that a higher flexural strength is obtained.

I claim:

1. A magnetic wedge comprising a cured thermosetting resin system containing about 65 to about 75% by volume elongated magnetizable particles oriented in the direction of said wedge and having a length to diameter ratio of at least about 250.

2. A magnetic wedge according to claim 1 wherein said particles are iron.

3. A magnetic wedge according to claim 2 wherein said particles are about 80 to about 90% by weight of said wedge.

4. A magnetic wedge according to claim 1 wherein said thermosetting resin system comprises a resin selected from the group consisting of epoxy resins and polyester resins.

5. A magnetic wedge according to claim 1 wherein said thermosetting resin system comprises an epoxy resin.

6. A magnetic wedge according to claim 1 wherein said resin system includes about 0.5 to about 1.5% of a flexibilizer.

7. A magnetic wedge according to claim 6 wherein said flexibilizer is polypropylene glycol.

8. A magnetic wedge according to claim 1 wherein said particles are iron.

9. A magnetic wedge according to claim 1 wherein said elongated particles are about 0.0003 inches in diameter and about 0.075 inches long.

* * * * *